United States Patent [19]

Zettergren

[11] Patent Number: 4,590,454
[45] Date of Patent: May 20, 1986

[54] CONTROL ASSEMBLY

[75] Inventor: Ted Zettergren, Nyland, Sweden

[73] Assignee: Hydrino AB, Nyland, Sweden

[21] Appl. No.: 655,558

[22] Filed: Sep. 28, 1984

[30] Foreign Application Priority Data

Oct. 5, 1983 [SE] Sweden .................................. 8305489

[51] Int. Cl.$^4$ ............................................ H01C 10/16
[52] U.S. Cl. .................................. 338/128; 74/473 R; 338/160
[58] Field of Search ............... 338/157, 158, 160, 162, 338/165, 166, 170, 178, 74, 117, 118, 125, 128; 74/473 R; 364/190; 200/62, 63 R, 65, 66, 67 R, 61.52, 6 A

[56] References Cited

U.S. PATENT DOCUMENTS

| | | | |
|---|---|---|---|
| 4,042,902 | 8/1977 | Meyer et al. | 338/160 X |
| 4,091,234 | 5/1978 | Bristow | 338/114 X |
| 4,172,248 | 10/1979 | Okuya | 338/176 |
| 4,375,631 | 3/1983 | Goldberg | 338/128 |

*Primary Examiner*—Clarence L. Albritton
*Assistant Examiner*—M. M. Lateef
*Attorney, Agent, or Firm*—Silverman, Cass & Singer, Ltd.

[57] ABSTRACT

A control assembly comprises a housing; a control lever extending from the housing and pivotally mounted therein; spring means arranged in the housing and effective to return the control lever automatically to a neutral position; and a potentiometer for converting movement of the control lever relative to the housing from the aforesaid neutral position to an electrical signal. According to the invention, the spring means (4) comprises two mutually connected tubular parts (8,9), between which the end of the control lever (3) located in the housing (2) is mounted for pivotal, but not rotational, movement, wherein in the neutral position of the control lever (3) the longitudinal axis of respective tubular parts (8,9) extends substantially at right angles to the longitudinal axis of the lever. The tubular parts (8,9) are axially movable relative to the housing (2) against the action of a coil spring (12,13) mounted in each of a respective one of the tubular parts and acting between the respective tubular parts and the housing (12). The control assembly further comprises a sliding-contact potentiometer (5) having a first part (30) which is connected to the tubular parts (8,9) and extends parallel with the axial extension thereof, and a second part (31) which is firmly secured relative to the housing (2).

6 Claims, 2 Drawing Figures

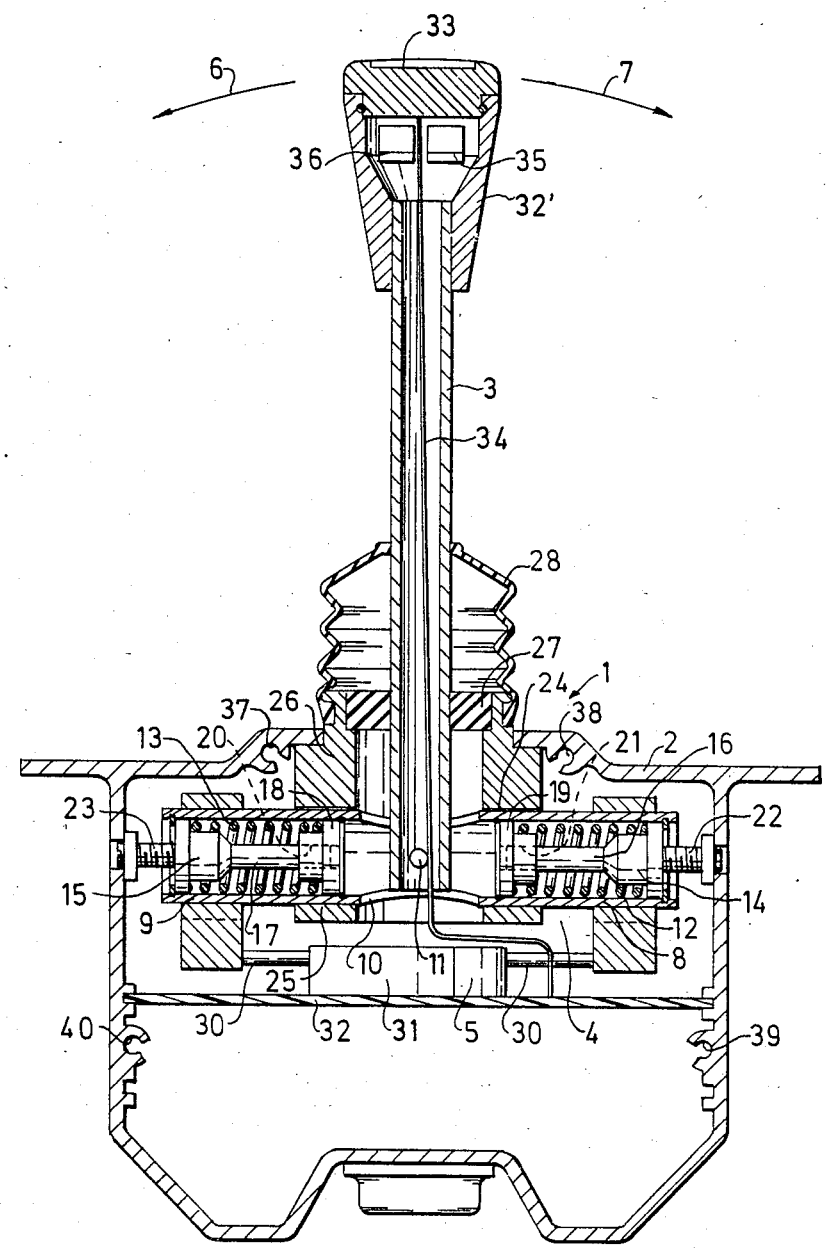
Fig_1

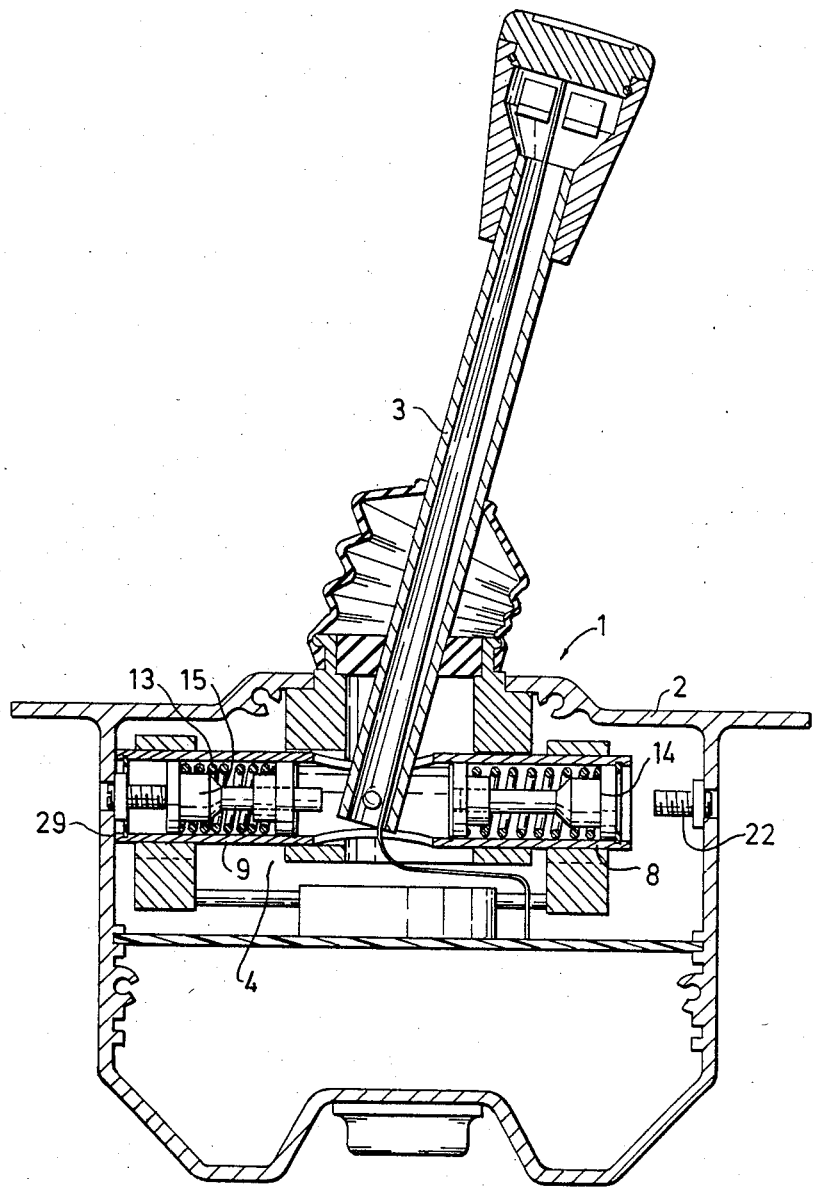
Fig_2

CONTROL ASSEMBLY

The present invention relates to a control assembly comprising a housing and a control lever, and in which movement of the control lever can be converted into an electrical signal. Such control assemblies are used generally for controlling electrically and hydraulically driven machines and equipment of various kinds.

One particular field in which such assemblies are used is in such working machines as diggers, forestry machines etc., in which a plurality of control units are mounted side-by-side and arranged to control hydraulic valves and therewith operate the machine.

In this respect it is often necessary to use switches for switching the control assembly between the various control modes for respective valves. This requirement is due to the fact that the desired number of control assemblies is smaller than the number of valves to be controlled.

It is convenient in this respect, and indeed preferred, to place the switches in a knob mounted on the top of the lever. One problem with such control assemblies, however, is that the requisite electrical conductors cannot be drawn through the control levers and the spring means associated therewith. Furthermore, the control levers are often secured by screwing them into the spring means. Such levers can be readily rotated about their longitudinal axes, in a manner to tear away those electrical conductors located in the near vicinity thereof.

Another serious problem associated with known control assemblies is that the control levers are not mounted tightly in the spring means, in the absence of any play. This problem arises from the fact that known assemblies comprise a large number of mechanical components between which there is a clearance. The presence of play in a control lever has a negative effect on the person manipulating the lever, since he subconsciously becomes tense when feeling for the point at which the play is taken up and manipulation of the valve commences.

Another problem with known control assemblies is that they are relatively complicated, which adds to the manufacturing costs. Furthermore, the mechanical solution applied is normally one which results in an assembly whose width, seen at right angles to the direction of movement of the lever, exceeds that desired. The desired width is at most about 40 mm.

The present invention solves the aforesaid problems and provides a simple construction which affords a number of advantages compared with known control assemblies, as will be evident from the following.

Thus, the invention relates to a control assembly comprising a housing; a control lever extending from the housing and pivotally mounted therein; spring means or spring unit arranged in said housing and effective in returning the control lever automatically to a neutral position; and a potentiometer for converting movement of said control lever relative to the housing from said neutral position to an electrical signal. The assembly is characterized in that the spring means comprises two mutually connected tubular parts, between which the end of the control lever located in the housing is mounted for pivotal, but not rotational, movement; in that in the neutral position of the control lever the longitudinal axes of respective tubular parts extend substantially at right angles to the longitudinal axis of said lever; in that each of the tubular parts is axially movable relative to the housing against the action of a coil spring mounted in a respective one of said tubular parts and acting between said respective tubular parts and said housing; and in that said control assembly further comprises a sliding-contact potentiometer having a first part which is connected to said tubular parts and extends parallel with the axial extension thereof, and a second part which is firmly attached relative to the housing.

The invention will now be described in more detail with reference to an embodiment of the control assembly illustrated in the accompanying drawings, in which:

FIG. 1 is a vertical sectional view of a control assembly, with the control lever in neutral; and FIG. 2 illustrates the control assembly of FIG. 1, but with the control lever shown out of neutral.

FIGS. 1 and 2 are vertical sectional views of an embodiment of a control assembly 1 designed in accordance with the invention.

The control assembly 1 comprises a housing 2 from which there extends a control lever 3, which is pivotally mounted in the housing 2. Arranged in the housing 2 is a spring means, generally shown at 4, which is effective in returning the lever automatically to a neutral position. Also arranged in the housing is a potentiometer 5, which converts movement of the lever 2 from its neutral position, in the directions of arrows 6,7, to an electric signal.

In accordance with the invention the spring means 4 comprises two mutually connected tubular parts 8,9. These parts preferably comprise a tube provided centrally of the tube parts with a through-passing hole 10. The end of the lever 3 located in the housing 2 is mounted for pivotal movement, but not rotational movement, between the tube parts 8,9. The lever 3 is inserted in the hole 10 and attached to the tube walls encircling the hole 10, by means of a pivot pin 11.

When the control lever 3 is in neutral, as illustrated in FIG. 1, the longitudinal axes of the tubular parts 8,9 extend substantially at right angles to the longitudinal axis of said lever.

The tubular parts 8,9 are axially movable in the housing 2 against the action of a spring force generated by a respective coil spring 12,13 located in each of the tubular parts, these springs acting between respective tubular parts 8,9 and the housing 2.

Arranged for axial movement in each of the tubular parts 8,9 is a respective piston 14,15 having a piston rod 16,17 which extends towards the attachment point 11 of the lever 2. Each tubular part 8,9 is provided at one end thereof with a plate 18,19, in which there is found a hole 20,21 for a respective piston rod 16,17. The opposite end of respective tubular parts 8,9 is open. The aforesaid coil springs 12,13 are mounted between the pistons 14,15 and respective plates 18 and 19. Also mounted in the housing 2 are two studs 22,23 each of which extends towards a respective free surface of the pistons. When the lever is in neutral, each stud lies against its respective piston, as shown in FIG. 1.

At least one of the studs 22,23 is mounted for axial movement relative the housing 2, towards and away from a respective piston 14,15, thereby enabling the spring means to be tensioned. The studs 22,23 suitably have the form of bolts or like devices screwed into the housing 2. As will be understood, all mechanical play in the spring means can be eliminated, by screwing in the studs 22,23 towards the pistons. In addition hereto, such an arrangement will enable a set bias to be given to both springs, so that a given, desired smallest force is required for movement of the lever 3 in the aforesaid directions 6 or 7.

In accordance with a preferred embodiment of the invention, the tubular parts 8,9 extend in radially formed holes 24, 25 in the lower part of a tubular sleeve 26, which is firmly anchored relative to the housing 2. According to this preferred embodiment, the lever 3 is slidably mounted in the upper part of the sleeve 26. In this respect, the lever 3 is conveniently mounted in a slide bearing 27 made of rubber or some other suitable material. A rubber cuff 28 is provided for sealing the assembly from the surroundings.

FIG. 2 illustrates the lever in an out-of-neutral position, namely in the positon indicated by the arrow 7 in FIG. 1. For the sake of clarity only certain components of the assembly have been reference in FIG. 2. When comparing FIG. 2 with FIG. 1, it will be seen that the left-hand piston 15 has been moved into the tubular part 9, as a result of axial movement of this tubular part to the left, against the wall 29 of the housing 2. In conjunction herewith, the coil spring 13 is compressed and the piston 14 in the right-hand tubular part moves out of engagement with its stud 22. Each of the tubular parts is provided at the open end thereof with a shoulder, lock-ring or like abutment, to prevent the pistons from leaving their respective tubular parts 8,9. Displacement of the spring means relative to a given movement of the lever 3 from its neutral position can be readily changed, by changing the position of the sleeve 26 vertically, and therewith the distance between the slide bearing 27 and the pivot pin 11. The sleeve 26 can also be so formed as to enable the position of the slide bearing 27 to be changed to various positions relative to the sleeve 26.

The spring means may be given a small width, as seen in a direction perpendicular to the paper. The spring means may have a smallest width corresponding approximately to 1.5 times the diameter of the tubular parts 8,9. The control assembly illustrated in FIGS. 1 and 2 is shown to a scale of approximately 1:1, and hence the width of the assembly can well be smaller than 40 mm.

Located beneath the spring means 4 is a sliding-contact potentiometer 5, one part 30 of which is attached to the tubular parts 8,9 and extends parallel with the longitudinal axis thereof. The other part 31 of the potentiometer 5 is firmly attached to a circuit board 32, which is connected in turn to the housing 2. The circuit card incorporates the electronic components required to produce an electric signal upon given movement of the lever 3. Since these electronic circuits do not form any part of the invention, they will not be described in detail here.

As will be evident from the aforegoing, movement of the lever 3 in the aforesaid directions 6 and 7 results in corresponding movement of the tubular parts 8,9, causing the firstmentioned, or former part 30 of the potentiometer 5 to move relaive its lastmentioned or latter part 31. Since the former potentiometer part 30 is attached to the tubular parts 8,9, which are in turn snugly mounted relative the housing 2, with the absence of any play, and the latter part 31 of the potentiometer is firmly anchored relative to the housing, there is no troublesome play between these mechanical components and the potentiometer. Large clearances between said components and the potentiomter, which clearances are quite possible in known assemblies, are likely to result in the premature activation of a control valve in one manner or another, without having moved the lever 3, due to the fact that the position of the potentiometer does not correspond exactly with the neutral position of the lever.

The lever 3 consists of a tube whose upper and lower ends are open. Mounted on the end of the lever located externally of the housing 2 is a lever knob 32'. According to one preferred embodiment, the knob incorporates electrical contacts 33. Trimming potentiometers 34,35 for the aforementioned electrical circuits are also suitably housed in the lever knob 32'. In this way, when calibrating the control assembly it is not necessary to have access to the circuit board 32. These electric contacts, or switches, 33 are used to switch-over the electric circuits, so that the control assembly can be used for controlling two or more valves, as mentioned in the introduction.

Electrical conductors 34 between the contacts 33 and the trimming potentiometers 35,36 are drawn through the lever 3 to the circuit board 32.

Because the lever cannot be rotated, there is no danger of the conductors 34 being torn away.

The aforedescribed control assmbly is of very simple design and can be readily modified with respect to the axial movement of the tubular parts 8,9 in respose to movement of the control lever from its neutral position and with respect to the spring force against which such movement takes place. In addition, the springs can be readily pretensioned, to obtain the bias desired.

It will apparent herefrom that the control assembly according to the invention completely solves the problems mentioned in the introduction.

According to one preferred embodiment, the housing 2 comprises an extruded profile-section which has been cut to the length required to accommodate one or more units in juxtaposed relationship. Subsequent to being cut to size, the profile-section is provided with end walls, which are screwed into the profile-section at screw-locations 37-40.

Such an embodiment enables a plurality of control levers and associated spring means to be mounted in one continuous profile-section and circuit boards 32 inserted in grooves 37,38 provided therefor in the profile-section, whereafter the end walls are screwed onto said profile-section.

In this way, adjacent control levers 3 can be placed relatively close to one another, if so desired. Furthermore, there is obtained a compact single assembly-unit, therewith facilitating the work involved in both manufacture and assembly.

It will be evident herefrom that the present invention affords advantages which are additional to the solution of the problems recited in the introduction.

The described and illustrated embodiment is not restrictive in any way, since various modifications can be made within the scope of the following claims.

I claim:

1. A control assembly comprising, a housing, a control lever extending from the housing and pivotally mounted therein, spring means arranged in said housing to return the control lever automatically to a neutral position, a potentiometer for converting movement of said control lever relative to the housing from said neutral position to an electrical signal, said spring means including two mutually connected tubular parts and a respective coil spring positioned in each tubular part, an end of said control lever being pivotally mounted in the housing between said coil springs, said springs acting in opposite directions relative to the lever, the longitudinal axes of the respective tubular parts extenting substantially at right angles to the longitudinal axis of said lever when the lever is in said neutral position, each of the tubular parts being axially movable relative to the housing against the action of said coil springs, an axially movable piston mounted in each tubular part, said coil springs being located between respective pistons and the ends of the respective tubular parts located adjacent the attachment point of said end of the control lever, respective studs mounted on the housing, each stud extending toward a respective free surface of the pistons such that each stud abuts against its respective piston when the lever is in said neutral position, said potentiometer having a first part connected to said tubular parts and extending parallel to an axial extension thereof, and a second part secured to the housing.

2. A control assembly as claimed in claim 1 in which at least one of said studs is axially movable relative to the housing towards and away from its associated piston to enable the spring means to be pre-tensioned.

3. A control assembly as claimed in claim 1 in which the tubular parts extend in radially formed holes in the lower part of a tubular sleeve which is secured to the housing, said control lever being slidably mounted in the upper part of said sleeve.

4. A control assembly as claimed in claim 1 in which the control lever includes a tube having open ends, a knob with electrical contacts mounted on the end of the lever located outside of the housing, and electrical conductors passing through the lever and extending between said contacts and a circuit board located in the housing.

5. A control assembly as claimed in claim 1 in which the housing is formed from an extrusion cut to a given length to accommodate one or more sub-assemblies in juxtaposed relation, each said sub-assemblies being fitted with end covers.

6. A control assembly as claimed in claim 5 in which the second part of the potentionmeter is connected to a circuit board inserted in a slot formed in said extrusion.

* * * * *